United States Patent Office

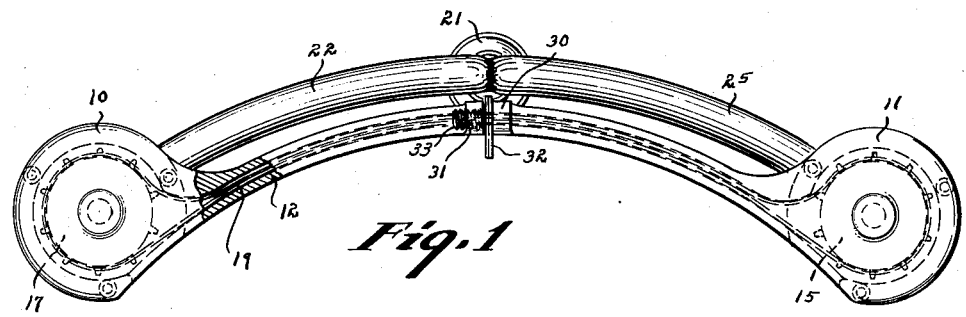

3,207,197
Patented Sept. 21, 1965

3,207,197
POWER DRIVEN HAND KNIFE FOR
TRIMMING FAT ON HAMS
Frederick F. Wilcox, 1506 Beaver Ave., Des Moines, Iowa
Filed June 11, 1962, Ser. No. 201,412
4 Claims. (Cl. 146—203)

This invention relates to knives, and more particularly to a hand knife having a powered moving cutting blade.

In the processing of meat, it is necessary to sever certain portions of the mass in order to accomplish certain desired results. This is especially true in the processing of hams wherein it is necessary to remove a certain amount of fat that surrounds the red or solid meat of the ham. The problem is not easily solved because heretofore the task was performed by a workman using an ordinary knife. Firstly, the procedure was slow and costly in time. Secondly, the final result was usually too much fat left on the ham, or not enough fat left on the ham. In any event, the layer of fat left on the ham was not uniform over the surface of the ham. Most such processed hams have a "black eye" appearance due to all fat being objectionably removed at spots.

Therefore one of the principal objects of my invention is to provide a powered hand knife that may be adjusted to remove only the desired amount of fat or like from a ham or like.

A further object of this invention is to provide a powered hand knife that may be adjusted to prevent the knife blade from reaching the red solid meat of a ham.

A still further object of this invention is to provide a powered hand knife that is easy to operate.

A still further object of this invention is to provide a meat processing aid that when used, is a saver of time and expense.

Still further objects of my invention are to provide a powered hand knife that is economical in manufacture, durable in use, and eliminates most accidents experienced by workmen when cutting up meat products.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a front view of my device with sections cutaway to more fully illustrate its construction and is taken from line 1—1 of FIG. 2.

FIG. 2 is a top plan view of the device with sections cut-away.

FIG. 3 is a cross-sectional view of the knife blade, cutting area taken on line 3—3 of FIG. 2, and FIG. 4 is a perspective view of my device in use.

In these drawings I have used the numerals 10 and 11, to designate two circular spaced apart housings. The numeral 12 designates an upwardly arched track having one end secured to the housing 10 and its other end secured to the housing 11.

This track is in the form of a U-channel in cross-section as shown in FIG. 3, and the inside of U-channel track communicates with the inside of both housings 10 and 11. The open U-channel track has its open side facing rearwardly. Rotatably mounted in the housing 10 is a sprocket gear wheel 15 having a drive shaft 16. The numeral 17 designates an idler sprocket gear wheel rotatably mounted in the housing 11. The numeral 19 designates an endless flexible knife belt strap blade embracing the two sprocket gears 15 and 17 and having its length between the two sprocket gears slidably extending through the track guide 12 as shown in FIG. 3. The sharp edge of the knife belt 19 extends to the rear and inasmuch as it has an upper length portion and a lower length portion in the track, one length will be slidably moving in one direction and the other length will be slidably moving in the opposite direction. The belt knife will be rotated by the sprocket wheel 15 and this is accomplished by its sprockets engaging spaced holes 20 in the knife belt. The numeral 21 designates a hollow handle portion. Extending forwardly, downwardly and outwardly from the handle 21 is a pipe 22. The forward end of this pipe is secured to the housing 10 and communicates with the power shaft 16 of the sprocket wheel 15.

The numeral 23 designates a flexible shaft rotatably extending through the handle 21 and pipe 22 and has its forward end rigidly secured to the power shaft 16. The rear end of this flexible shaft is adapted to be connected to any suitable power means such as an electric motor (not shown). The numeral 25 designates a pipe extending forwardly, outwardly and downwardly from the handle 21 and has its forward end secured to the housing 11. The numeral 26 designates a flexible water tube extending through the handle 21, and through the rear portion of the pipe 25. The tube 26 exits from the pipe 25, and has an outlet jet 27 directed toward the knife belt in the U-track as shown in FIG. 2. The rear end of the tube 26 is adapted to be in communication with a source of water under pressure (not shown). Imposed in the tube 26 and on the handle 21, is a valve 29 for controlling or preventing water from passing through the tube 26.

By this arrangement of parts, the device when in use, will cut in a curved path as shown in FIG. 4. All that is required is for the workman to grasp the handle and draw the device rearwardly. The cutting blade is at a distance from the workman's hand, and the accidental cutting of the workman is substantially impossible. The meat cutting phase is easy and rapid due to the motorized belt blade.

As herebefore indicated, the problem is to regulate the thickness of the fat left on the ham. I accomplish this by a depth gauge means. On the forward center of the track 12 are two spaced apart vertical knife hold bars 30 and 31. The numeral 32 designates a rigid knife blade adjustably vertically slidable between the two bars 30 and 31. A set screw 33 is threaded through the bar 30 for engagement with the blade 32, when tightened, thus adjustably rigidly securing the blade 32 to the two supporting bars 30 and 31. The adjustment of the blade 32 is vertical, extends downwardly below the bars 30 and 31 and has its sharpened rear edge extending transversely of the belt knife moving through the track 12, and as shown in FIG. 2. While the rear edge of the blade 32 is sharpened for cutting meat, when the tool is drawn rearwardly through the meat, its bottom end is unsharpened as shown in FIG. 1.

The reason for this unsharpened bottom end of the blade 32 is that being dull it will pass downwardly in the fat but will not cut into solid, or red meat.

Therefore the dull bottom end of the blade 32 will ride on the red or solid meat and act as a gauge to limit the downward movement of the belt knife in the layer of fat.

Thus the desired thickness of fat will be left on the ham and this thickness will be most uniform. The water jet may be directed, whenever desired, toward the blades and this fluid may be either hot or cold. Water is excellent for lubricating the cutting blade means and this is particularly true if hot or warm water is used. If it is desired to reset the blade 32 for a different depth of cut, it is merely necessary to loosen the set screw, move the blade to the new desired position, and then re-tighten the set screw.

Some changes may be made in the construction and arrangement of my power driven hand knife without departing from the real spirit and purpose of my invention, and it is my intention to cover by any claims, any modified forms of structure or use of mechanical equivalents which may be reasonably included within their scope.

I claim:

1. In a hand tool for cutting meat fat or the like, comprising, a frame having a handle member for holding said tool and two spaced apart members, a track member extending between said two spaced apart members, a rotatable member at each end of said track, said track member having a pair of closely spaced parallel walls extending along its length between said two spaced apart members, said walls forming an elongated recess therebetween, an endless knife belt embracing each of said rotatable members and having at least two intermediate portions of its length slidably mounted in said elongated recess, the outer edge of said belt being sharpened and extending outwardly of the walls and recesses, said two intermediate portions of said belt closely adjacent each other such that they function as a single knife, a power means operatively connected to said belt to continuously rotate said band whereby said two intermediate portions will move simultaneously in opposite directions in said elongated recess, a depth knife blade gauge is operatively secured to said track adjacent the intermediate portion of said belt, said gauge extending perpendicular to said belt, said gauge having a sharpened edge and said sharpened edge of said gauge facing the same direction as said outer sharpened edge of said belt, said gauge having an outer blunt end surface extending perpendicular to said sharpened edge of said gauge, and said tool adapted to be drawn across a ham, or the like, having meat covered with fat, and said sharpened edge of said depth gauge being adapted to cut through said fat with the blunt end surface of said gauge riding on the meat of said ham whereby said two intermediate portions of said endless belt will cut all the fat off of the ham beyond a predetermined uniform distance from the meat.

2. In a hand tool for cutting meat fat or the like, comprising, a frame having a handle member for holding said tool and two spaced apart members, a track member extending between said two spaced apart members, a rotatable member at each end of said track, said track member having a pair of closely spaced parallel walls extending along its length between said two spaced apart members, said walls forming an elongated recess therebetween, an endless knife belt embracing each of said rotatable members and having at least two intermediate portions of its length slidably mounted in said elongated recess, the outer edge of said belt being sharpened and extending outwardly of the walls and recesses, said two intermediate portions of said belt closely adjacent each other such that they function as a single knife, a flexible shaft rotatably disposed in one of said spaced apart members, one end of said shaft being connected to a power means and the other end being coupled to the adjacent rotatable member, said adjacent rotatable member adapted to continuously rotate said band whereby said intermediate portions will move simultaneously in opposite directions in said elongated recess, a depth knife blade gauge is operatively secured to said track adjacent the intermediate portion of said belt, said gauge extending perpendicular to said belt, said gauge having a sharpened edge and said sharpened edge of said gauge facing the same direction as said outer sharpened edge of said belt, said gauge having an outer blunt end surface extending perpendicular to said sharpened edge of said gauge, and said tool adapted to be drawn across a ham, or the like, having meat covered with fat, and said sharpened edge of said depth gauge being adapted to cut through said fat with the blunt end surface of said gauge riding on the meat of said ham whereby said two intermediate portions of said endless belt will cut all the fat off of the ham beyond a predetermined uniform distance from the meat.

3. In a hand tool for cutting meat fat or the like, comprising, a frame having a handle member for holding said tool and two spaced apart members, a track member extending between said two spaced apart members, a rotatable member at each end of said track, said track member having a pair of closely spaced parallel walls extending along its length between said two spaced apart members, said walls forming an elongated recess therebetween, an endless knife belt embracing each of said rotatable members and having at least two intermediate portions of its length slidably mounted in said elongated recess, the outer edge of said belt being sharpened and extending outwardly of the walls and recesses, said two intermediate portions of said belt closely adjacent each other such that they function as a single knife, a flexible shaft rotatably disposed in one of said spaced apart members, one end of said shaft being connected to a power means and the other end being coupled to the adjacent rotatable member, said adjacent rotatable member adapted to continuously rotate said band whereby said intermediate portions will move simultaneously in opposite directions in said elongated recess, a conduit disposed in the other of said spaced apart members, one end of said conduit being coupled to a water source and the other end having a discharge opening directed toward said belt knife, a depth knife blade gauge is operatively secured to said track adjacent the intermediate portion of said belt, said gauge extending perpendicular to said belt, said gauge having a sharpened edge and said sharpened edge of said gauge facing the same direction as said outer sharpened edge of said belt, said gauge having an outer blunt end surface extending perpendicular to said sharpened edge of said gauge, and said tool adapted to be drawn across a ham, or the like, having meat covered with fat, and said sharpened edge of said depth gauge being adapted to cut through said fat with the blunt end surface of said gauge riding on the meat of said ham whereby said two intermediate portions of said endless belt will cut all the fat off of the ham beyond a predetermined uniform distance from the meat.

4. In a hand tool for cutting meat fat or the like, comprising, a frame having a handle member for holding said tool and two spaced apart members, an arcuate track member extending between said two spaced apart members, a rotatable member at each end of said track, said track member having a pair of closely spaced parallel arcuate walls extending along its length between said two spaced apart members, said walls forming an elongated recess therebetween, an endless knife belt embracing each of said rotatable members and having at least two intermediate portions of its length slidably mounted in said elongated recess, the outer edge of said belt being sharpened and extending outwardly of the walls and recesses, said two intermediate portions of said belt closely adjacent each other such that they function as a single knife, a power means operatively connected to said belt to continuously rotate said band whereby said two intermediate portions will move simultaneously in opposite directions in said elongated recess, a depth knife blade gauge is operatively secured to said track adjacent the intermediate portion of said belt, said gauge extending perpendicular to said belt, said gauge having a sharpened edge and said sharpened edge of said gauge facing the same direction as said outer sharpened edge of said belt, said gauge having an outer blunt end surface extending perpendicular to said sharpened edge of said gauge, and said tool adapted to be drawn across a ham, or the like, having meat covered with fat, and said sharpened edge of said depth gauge being adapted to cut through said fat with the blunt end surface of said gauge riding on the meat of said ham whereby said two intermediate portions of said endless belt will cut all off of the ham beyond a predetermined uniform distance from the meat.

References Cited by the Examiner

UNITED STATES PATENTS

| | | | |
|---|---|---|---|
| 1,416,723 | 5/22 | Krafft | 146—130 X |
| 1,759,478 | 5/30 | Bergstrom | 146—88 |
| 1,936,688 | 11/33 | Rieske et al. | 146—130 X |
| 2,129,234 | 9/38 | Perrin | 146—130 |
| 2,656,600 | 10/53 | Barbee. | |
| 2,684,530 | 7/54 | Weinberg | 30—123 |
| 2,856,974 | 10/58 | Schulpen. | |
| 2,974,413 | 3/61 | Williams | 17—21 X |

FOREIGN PATENTS 772,336   8/34   France.

J. SPENCER OVERHOLSER, *Primary Examiner.*